May 3, 1932.  G. DELPECH  1,857,080
PROCESS FOR THE MANUFACTURE OF SILICA ARTICLES WITH GLAZED SURFACE
Filed June 9, 1927
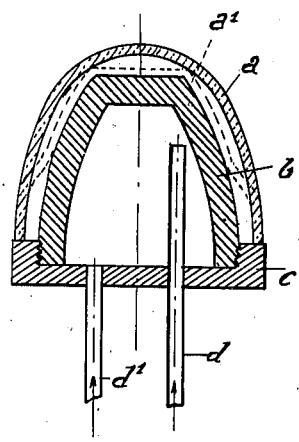
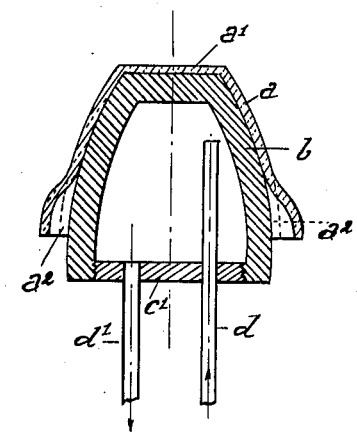
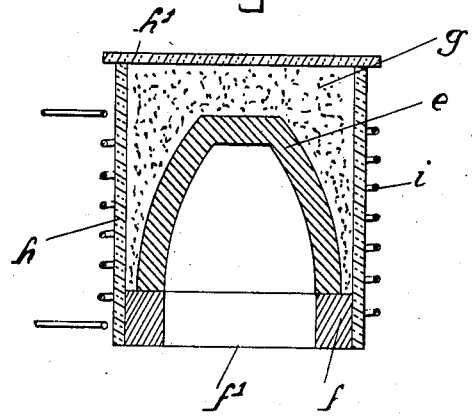
INVENTOR
GASTON DELPECH
BY HIS ATTORNEYS
Howson and Howson Patented May 3, 1932

1,857,080

UNITED STATES PATENT OFFICE

GASTON DELPECH, OF NEMOURS, FRANCE, ASSIGNOR TO THE SOCIÉTÉ QUARTZ & SILICÉ, OF PARIS, FRANCE, A CORPORATION OF FRANCE

PROCESS FOR THE MANUFACTURE OF SILICA ARTICLES WITH GLAZED SURFACE

Application filed June 9, 1927, Serial No. 197,772, and in France July 15, 1926.

Laboratory articles such as crucibles, capsules, dishes, made of pure fused silica with a glazed surface, are at present manufactured industrially by one or other of the following processes:

In a first process, one starts by obtaining a hollow cylindrical blank of fused silica which is blown in a mould in the ordinary way; this mould comprises a large number of cells corresponding to the final shape of the articles to be obtained (crucibles, capsules). These articles are then cut off and their surface reglazed by means of an arc or a blow-pipe, after they have been placed upon graphite patterns in order to prevent them from being deformed.

The second process consists in drawing the hollow blank of fused silica in the form of a tube and in cutting it along the axis and perpendicularly to this axis into small elements of cylindrical surface. These small elements are then remelted by the aid of the blow-pipe upon patterns, which give to the article its final appearance and dimensions,— the blow-pipe acting in this case both as the source of heat and as the tool by reason of the pressure which the gases of the flame exert upon the cylindrical plate.

These two processes present disadvantages:

The first process yields articles in which the glazing by re-melting is insufficient, the contact of the pattern preventing the complete softening of the blank, that is to say the vitrification of its interior surface.

In the second process, there is the advantage of a high yield of fused material, since the whole cylinder obtained is utilized; on the other hand, the obtaining of a deep crucible, for example, by the aid of an element of cylindrical surface, presents great difficulties, by reason of the considerable surface tension of fused silica, and requires a very high expenditure of energy which exceeds the benefit realized in the first part of the operation.

The process according to the invention consists in preparing, by moulding, blanks of a shape approximating that of the article to be obtained, but of larger dimensions, and in then giving to this blank its final shape and dimensions by taking advantage of the considerable surface tension which fused silica possesses when it is softened. For this purpose, the blank is placed upon a pattern, preferably made of metal, with interior cooling by circulation of water, this pattern having for its external dimensions the final internal dimensions of the article to be obtained. Care is taken that the blank shall be maintained at a certain distance from the pattern, in such a way that, as a result of heating, the blank is made to contract upon the pattern during the softening of the silica and that the blank adopts the contours of the pattern under the action of gravity and of the high surface tension of the silica, to the exclusion of any other force.

This process ensures perfect vitrification of the silica articles, this being due to the natural subsidence of the silica, and gives them exact dimensions and a perfectly regular and smooth appearance upon their external and internal surfaces; moreover, these articles possess a strength and homogeneity greater than articles obtained by the other processes.

The accompanying drawings represent by way of example one form of carrying out the invention in its application to the manufacture of a crucible.

Figures 1 and 2 are views in axial vertical section of the blank in place upon its pattern, in two successive phases of the process.

Figure 3 is a corresponding view in section of a furnace adapted to be utilized for carrying out the process.

As in the first known process mentioned above, one starts by effecting by blowing the moulding of a hollow cylindrical blank in a mould, comprising a large number of cells, but these have not the final shape of the article to be obtained; they have a shape approximating to the latter but larger dimensions; for example if the crucible to be manufactured is of a diameter 43, the cell of the mould will be such that the blank obtained will have a diameter of about 50.

The blank $a$, roughly cut out from the complete piece obtained by this moulding, is placed upon a pattern $b$ (Figure 1) presenting externally the final internal shapes and dimensions of the crucible to be obtained.

The pattern used has on its active face a shape and dimensions corresponding to that of the article to be obtained. This pattern $b$ is constituted, for example, by a hollow member, made of pure nickel or any metal alloy having a high content of nickel and not reacting upon silica. This member is closed at its lower end by a screw-threaded plug $c$, comprising two tubes $d$ $d^1$, serving respectively as entrance and exit for the water circulation intended to cool the nickel pattern. This plug $c$ serves likewise as support or abutment for the blank $a$ in such a way that there remains between the pattern $b$ and the blank an interval of some millimetres.

By submitting the blank to the action of a suitable source of heat of any kind, there is produced the subsidence of the upper part of this blank, corresponding to the bottom $a^1$ of the crucible, upon the pattern $b$.

When this first phase of the operation is terminated, the article $a$ is placed upon a second pattern $b$ exactly similar to the first (Figure 2), but with a plug $c^1$ no longer forming an abutment as in the case of the preceding phase (Figure 1), for maintaining the blank at slight distance from the pattern; the same pattern may likewise be utilized by replacing the plug $c$, or patterns fitted with detachable abutment may be utilized. The lower part of the blank $a$ can thus likewise contract and subside upon the pattern, as a result of the surface tension of the softened silica, at $a^2$.

It has been ascertained that a pattern $b$ made of nickel, or metal alloy with a high content of nickel, could support the contact of the fused silica and did not communicate to this latter any stain or colouration, which is not the case with graphite patterns employed hitherto, patterns of which the life is moreover, considerably less.

As source of heat for these two phases of the operation, there may be employed the electric arc, or the oxyhydrogen blow-pipe, but it is more convenient and more economical, for manufacture in series, to employ for the heating a small electrical induction furnace, such as represented in Figure 3, this furnace allowing of obtaining a very high speed of subsidence of the blank and a really industrial succession of the operations.

This furnace comprises (Figure 3) a graphite member $e$ serving to some extent as a muffle, presenting dimensions slightly greater than those of the blank. This member $e$ may have a shape varying with the blank of which the subsidence upon the pattern is desired; in principle its dimensions are approximately those of the blank so as to ensure the rapid heating and fusion of the latter.

This member $e$ is supported by a ring $f$, of amorphous carbon, comprising an opening $f^1$ through which there can be introduced into the furnace the group formed by the blank $a$ and its nickel pattern $b$. The graphite member or muffle $e$ is embedded in a heat-insulating mass $g$ formed for example by lamp black, and contained in a tubular casing $h$ provided with a cover $h^1$. At the exterior of this casing $h$ is arranged an inductor winding $i$, traversed by a high frequency current. The currents induced by this inductor winding in the mass of member $e$ raise its temperature very rapidly up to the point suitable for ensuring the subsidence of the blank upon the pattern.

This furnace may be employed only for the first operation (Figure 1). There might likewise be utilized any other convenient method of heating.

What I claim is:

1. A process for the manufacture of silica articles with glazed surfaces, consisting in first molding a blank, substantially similar geometrically to the article to be obtained, supporting this blank over but spaced from a pattern, which has on its active face a shape and dimensions corresponding to those of the article to be obtained, heating said blank to a temperature adapted to produce the remelting and glazing thereof, out of contact with the pattern, and to produce its softening to effect the subsidence of part of the blank onto the pattern under the action of the surface tension and weight of the softened silica, then transferring the blank onto another pattern, exactly similar to the first, onto which the remainder of the blank then similarly subsides.

2. A process for the manufacture of silica articles with glazed surface, consisting in first molding a blank, substantially similar geometrically to the article to be obtained, supporting this blank by its rim over but spaced from a pattern, which has on its active face a shape and dimensions corresponding to those of the article to be obtained, heating said blank to a temperature adapted to produce the remelting and glazing thereof, out of contact with the pattern, and to produce its softening to effect the subsidence of the blank, with the exception of its rim portion, onto the said pattern, under the action of the surface tension and weight of the softened silica, then transferring the blank onto another pattern, exactly similar to the first, onto which the rim portion of the blank similarly subsides.

3. A process for the manufacture of silica articles with glazed surface, consisting in first molding a blank, substantially similar geometrically to the article to be obtained, but of larger dimensions,—supporting this blank over but spaced from a pattern having externally the final internal dimensions and shape of the article to be obtained,—heating said blank to a temperature adapted to produce the remelting and glazing thereof, out of contact with the pattern, and to produce its softening to effect the subsidence of the blank, with the exception of its rim portion, onto the pattern, under the action of the surface tension and weight of the softened silica,—then transferring the blank onto another pattern, exactly similar to the first, onto which the rim portion of the blank similarly subsides.

In witness whereof I have hereunto set my hand.

GASTON DELPECH.